United States Patent [19]

Lai et al.

[11] Patent Number: 5,628,942

[45] Date of Patent: May 13, 1997

[54] PROCESS FOR THE PREPARATION OF ASYMMETRIC TPX POROUS MEMBRANES FOR GAS SEPARATION

[75] Inventors: Juin-Yih Lai, Taoyuan Hsien; Fung-Ching Lin, Kaohsiung, both of Taiwan

[73] Assignee: National Science Council, Taipei, Taiwan

[21] Appl. No.: 438,390

[22] Filed: May 10, 1995

[51] Int. Cl.$^6$ .................................................. B29C 67/20
[52] U.S. Cl. .......................... 264/41; 264/101; 264/216; 264/232; 264/234
[58] Field of Search .......................... 264/41, 101, 216, 264/232, 234, 331.17

[56] References Cited

PUBLICATIONS

Lai, Juin–Yih, et al. "Polycarbonate/(DMF/Metal Salt) Complex . . . " Eur. Polym. J., vol. 30, No. 7 (1994), pp. 833–843.

Pinnau, Ingo, et al. "Structures and Gas Separation . . . " Journal of Applied Polymer Science, vol. 43 (1991), pp. 1491–1502.

Lai, Juin–Yih, et al. "Polycarbonate membrane prepared via . . . " Journal of Membrane Science, vol. 86 (1994), pp. 103–118.

Lai, J.Y., et al. "Preparation of Vinylpyridine . . . " Journal of Applied Polymer Science, vol. 32 (1986) pp. 5763–5775.

Lai, J.Y., et al. "TPX/Siloxane Blend Membrane . . . " Journal of Applied Polymer Science, vol. 34 (1987) pp. 559–569.

Lai, J.Y., et al. "MMA/TPX Homograft Membrane . . . " Journal of Applied Polymer Science, vol. 37 (1989) pp. 2907–2919.

*Primary Examiner*—Leo B. Tentoni
*Attorney, Agent, or Firm*—Ladas & Parry

[57] ABSTRACT

Asymmetric TPX porous membranes for gas separation are prepared by wet, and dry/wet phase inversion methods. A casting polymer solution including TPX, a selected solvent and optionally a selected non-solvent, is casted on a support, and within 100 seconds after the casting step, the casted polymer is immersed in a coagulant to form a membrane. The formed membrane is extracted, dried and optionally heat treated.

19 Claims, 1 Drawing Sheet

PROCESS FOR THE PREPARATION OF ASYMMETRIC TPX POROUS MEMBRANES FOR GAS SEPARATION

BACKGROUND OF THE INVENTION

The present invention relates to a process for preparing asymmetric poly(4-methyl-pentene-1)(hereinafter referred to as TPX) porous membranes for gas separation, and in particular to a process for preparing asymmetric TPX porous membranes for gas separation by wet phase and dry/wet inversion method.

Several materials, such as poly(4-methyl-pentene-1) (TPX), polysulfone (PSf), polymethyl siloxane, polyimide, acetic acid cellulose, and polycarbonate, have been used in the preparation of porous membranes for gas separation, especially oxygen-nitrogen separation. Among them, TPX, due to its excellent mechanical strength, high oxygen/nitrogen selectivity and fairly high gas permeability, has been commercialized. Taking the X-22, a TPX oxygen-nitrogen separation membrane supplied by Mitsui Co. Ltd, Japan, for example, its permeability ratio of $O_2/N_2$ can reach 4.15 and the oxygen permeability thereof is 0.61 GPU(1 $GPU=1\times 10^{-6} cm^3/cm^2 \cdot sec\times cm$ Hg). However, there is still a need to further increase the gas permeability while retaining permeability ratio of $O_2/N_2$ so as to increase the commercial value of the TPX separation membranes. To improve the gas permeability of TPX membranes, composite and/or grafted TPX membranes have been developed for gas separation. For example, in *J. Appl. Polym. Sci.*, 32, 5763 (1986), there is disclosed a 4-vinylpyridine γ-ray irradiation-grafted TPX membrane. Its oxygen permeability is 25.4 Barrer (1 Barrer=$1\times 10^{-10}$ $cm^3\times cm/cm^2\times sec\times cm$ Hg), and the permeability ratio of $O_2/N_2$ is 11.1. In *J. Appl. Polym. Sci.*, 34 559(1987), a TPX/siloxane blend membrane for oxygen enrichment is disclosed. The obtained membranes have an oxygen permeability of 57.4 Barrer and a permeability ratio of $O_2/N_2$ of 7.81.

Recently, due to the process complexity and the high material cost for the production of composite and/or grafted TPX membranes, a wet phase inversion method has been developed for the preparation of asymmetric porous membranes for gas separation. A polymer solution is cast on a suitable support and immersed in a nonsolvent coagulation medium. The asymmetric membrane is formed by exchange of solvent and coagulation medium and the resulting structure is a formed membrane having an integral skin layer suitable for gas separation and a porous base layer having low permeation resistance. For example, in *J. Appl. Polym. Sci.*, 43, 1491 (1991),a PSf asymmetric porous membrane was prepared and was reported to have improved gas permeability. In *J. Membr. Sci.*, 86, 103(1994) and *Eur. Polym. J.* 30, 883(1994), PC asymmetric membranes having high gas permeability have been prepared by wet phase inversion method by respectively adding additive nonsolvent alcohols and oxygenphilic transition metal salts to the casting solution.

TPX membranes for gas separation have not yet been prepared by wet phase inversion method.

SUMMARY OF THE INVENTION

It is therefore an object of the invention to provide a simplified process for preparing asymmetric TPX porous membranes having high gas permeability for gas separation To attain the above object, according to the invention, wet phase inversion method and wet/dry phase inversion method are used. The wet/dry phase inversion method refers to a method in which after a polymer solution is cast on a suitable support, the cast polymer is not immediately immersed in a nonsolvent coagulant, but is held for a period of time, for example a few seconds to let a part of the solvent contained therein to volatilize before being immersed in a nonsolvent coagulant. The process of the invention involves dissolving TPX in a selected solvent to form a casting polymer solution, casting the casting polymer solution onto a support and immersing the casted polymer in a selected coagulant to form a membrane, followed by extraction and drying step. The process of the invention is characterized in the selection of optimum compositions of casting solution, coagulant and extractor.

BRIEF DESCRIPTION OF THE DRAWINGS

The present invention can be more fully understood by reference to the following detailed description and accompanying drawings, which form an integral part of this invention.

DETAILED DESCRIPTION OF THE INVENTION

According to the process of the invention, the solvents used for the dissolution of TPX include cyclohexane, cyclohexene, trichloromethane, and tetrachloromethane. Mixtures of the above solvents are also suitable for use for dissolving TPX. Nonsolvents can also be added to the solution of TPX, and their amount should be in the range of 0–30 vol %. Suitable nonsolvents include alcohols, ketones, esters and the mixture thereof. Preferably, these alcohols, ketones and esters have 1–6 carbons. The concentration of TPX in the solution is 2.5–10 wt %. The solution of TPX is prepared by mixing TPX, solvents and optionally the nonsolvents at a temperature of 35°–70° C.

The prepared casting polymer solution is then cast onto any suitable supports, such as a plate made of glass, a fluorocarbon polymer such as TEFLON (polytetrafluoroethylene), metal, or a film, woven fabric or on nonwoven fabric made of example fabrics made of PVDF or a polysulfone to a predetermined thickness by any conventional methods, such as casting polymer solution on the support by using a Gardner knife. The thickness will depend on the support used but for use on a glass plate will normally be in the range 100–600 μm, preferably 300 μm.

The casted polymer together with the support are then immersed in a nonsolvent coagulant to coagulate the polymer so as to form a membrane on the support. Coagulants suitable for forming the membrane include alcohols, mixed alcohols, or aqueous solution of alcohols. Preferably, the alcohols used are $C_1$–$C_8$ alcohols. Preferably, before being immersed in the coagulant, some of the solvent is evaporated from the cast polymer at a predetermined temperature, typically in the range of 25° C. to 80° C. The time period for this evaporation can be 1–100 seconds.

The formed membranes are then separated from the supports, and extracted in an extraction tank containing extractor solvents to remove the solvent or nonsolvent contained in the membranes, followed by drying to finish the process. The extractor solvents used for the extraction can be water, alcohols, ketones, esters or mixture thereof $C_1$–$C_8$ alcohols, $C_1$–$C_8$ ketones and/or $C_1$–$C_8$ esters can be used.

The drying can be conducted by any method know to those skilled in this art, such as air drying and vacuum drying, and preferably is conducted at a temperature of 25° C. to 100° C. After the drying process, the dried membrane can further be subjected to a heat treatment to accelerate the aging of the dried membrane. The heat treatment can be for example, conducted at a temperature of from 25° C. to 125° C. for 1–12 hours.

The invention is more specifically described by the following illustrative examples.

EXAMPLE 1

Figure 1:
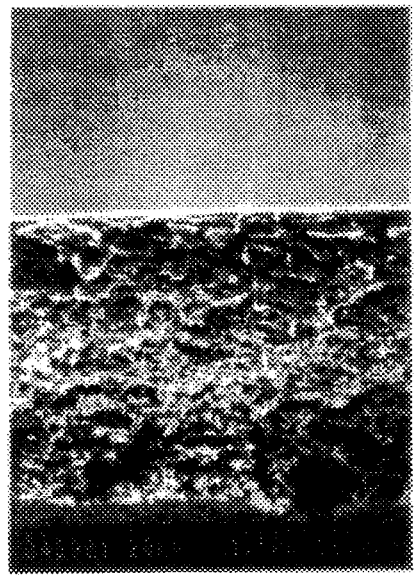
FIG. 1 is a SEM photograph showing the sectional view of the membrane prepared in Example 1.

4 g of TPX was dissolved in 80 ml of trichloromethane, agitated at 60° C. for more than 12 hours, and allowed to stand for a further 12 hours to form a 5% (W/V) casting polymer solution. The casting polymer solution was then immediately immersed in a coagulant tank containing 99 wt % of methanol to form a membrane. The formed membrane, after 10 minutes, was again dipped in an extraction tank containing methanol to extract the solvent contained in the membrane out. The membrane was then peeled off and air dried. The finished air dried membrane was examined by a scanning electronic microscope, and a sectional view of the formed TPX membrane was shown in FIG. 1. The oxygen permeability of the obtained membrane was determined by using the Yanaco GTR-10 gas permeation analyzer (Yanagimoto Mfg. Co., Ltd., Japan), and the permeability ratio of $O_2/N_2$ was calculated. The oxygen permeability was 103 GPU and the permeability ratio of $O_2/N_2$ was 2.66.

EXAMPLE 2

The same procedures of Example 1 were repeated except that the solvent in the extraction tank was replaced with water, ethanol, n-propanol, and n-butanol respectively. The oxygen permeability and the $O_2/N_2$ permeability ratio of each formed membranes are summarized in Table 1 below.

TABLE 1

| extraction solvent | oxygen permeability (GPU) | $O_2/N_2$ permeability ratio |
| --- | --- | --- |
| water | 17.0 | 3.32 |
| ethanol | 39.5 | 2.95 |
| n-propanol | 19.6 | 2.85 |
| n-butanol | 5.03 | 3.67 |

EXAMPLE 3

The same procedures of Example 1 were repeated except that the formed membrane was dried by vacuum drying in a closed vessel evacuated to 3.5 torr. The membrane was measured to has an oxygen permeability of 44.7 GPU and an oxygen-nitrogen separation coefficient of 3.17.

EXAMPLE 4

The same procedures of Example 1 were repeated except that a further heat treatment at a temperature of 50° C., after the drying, was conducted to accelerate the aging of the formed membrane. The membrane so obtained had an oxygen permeability of 13.3 GPU and a $O_2/N_2$ permeability ratio of 3.55.

EXAMPLE 5

Figure 2:
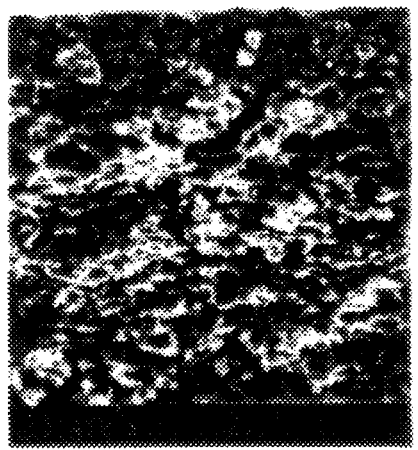
FIG. 2 is a SEM photograph showing the sectional view of the membrane prepared in Example 5.

5 g of TPX was dissolved in mixed solvent of 80 ml of cyclohexane and 15 ml of n-butanol, agitated at 60° C. for 12 hours, and allowed to stand at 40° C. for a further 12 hours. The casting polymer solution was then uniformly coated on a TEFLON plate to a thickness of 300 μm by using a Gardner knife, allowed to volatilize for 30 seconds, and then immersed in a coagulant tank containing 90 wt % of ethanol to form a membrane. The formed membrane was then dipped in an extraction tank containing 99 wt % methanol to extract the solvent contained in the membrane out for 10 minutes. After air drying, the membrane was placed in a 50° C. thermostat for heat treatment for 12 hours. The finished membrane was examined by scanning electronic microscope, and the oxygen permeability and $O_2/N_2$ permeability ratio were also measured. A sectional view of the formed TPX membrane was shown in FIG. 2. The oxygen permeability was 21 GPU and the $O_2/N_2$ permeability ratio was 3.06.

EXAMPLE 6

2 g of TPX was dissolved in a mixture of 20 ml of trichloromethane and 20 ml of cylclohexane, agitated at 60° C. for more than 12 hours, and allowed to stand for a further 12 hours to form a 5% (W/V) casting polymer solution. The casting polymer solution was then uniformly coated onto a glass plate to a thickness of 300 μm by using a Gardner knife, and immediately immersed in a 25° C. coagulant tank containing 99 wt % of methanol to form a membrane. The formed membrane was again dipped in an extraction tank containing iced water to extract the solvent contained in the membrane out for 10 minutes. After air drying, the oxygen permeability and $O_2/N_2$ permeability ratio of the finished membrane were measured. The oxygen permeability was 39.1 GPU and the $O_2/N_2$ permeability ratio was 3.01.

What is claimed is:

1. A process for preparing an asymmetric poly(4-methyl-pentene-1) porous membrane for separation, comprising:
    (a) preparing a casting polymer solution comprising poly(4-methyl-pentene-1) and a solvent selected from the group consisting of cyclohexane, cyclohexene, trichloromethane, tetrachloromethane and mixtures thereof;
    (b) casting said casting polymer solution on a support;
    (c) immersing within 100 seconds after the casting of step (b) the casted polymer together with the support in a nonsolvent coagulant comprising an alcohol to form a membrane;
    (d) extracting the membrane; and
    (e) drying the membrane.

2. The process as claimed in claim 1, wherein said casting polymer solution of step (a) further comprises up to 30 volume % of a nonsolvent selected from the group consisting of $C_1$–$C_6$ alcohols, $C_1$–$C_6$ ketones, $C_1$–$C_6$ esters and mixtures thereof based on the total volume of the solvent and nonsolvent.

3. The process as claimed in claim 1, wherein the amount of the poly(4-methyl-pentene-1) is 2.5–10 wt % based on the total weight of the polymer solution.

4. The process claimed in claim 1, wherein said casting polymer solution of step (a) further comprises up to 30 volume % of a nonsolvent selected from the group consisting of alcohols, ketones, esters and mixtures thereof based on the total volume of the solvent and non-solvent.

5. The process as claimed in claim 1, wherein said casting polymer solution is prepared by mixing poly(4-methyl-pentene-1) and said solvent at a temperature of 35°–70° C.

6. The process as claimed in claim 1, wherein said coagulant is an aqueous solution of alcohol.

7. The process as claimed in claim 1, wherein said coagulant is a mixture of alcohols.

8. The process as claimed in claim 1, wherein said coagulant is an alcohol.

9. The process as claimed in claim 6, wherein said alcohol is a $C_1$–$C_8$ alcohol.

10. The process as claimed in claim 7 wherein said alcohol is a $C_1$–$C_8$ alcohol.

11. The process as claimed in claim 8 wherein said alcohol is a $C_1$–$C_8$ alcohol.

12. The process as claimed in claim 1, wherein the extraction of step (d) is carried out in a solution including water.

13. The process as claimed in claim 1, wherein the extraction is carried out in a solution comprising a solvent selected from the group consisting of $C_1$–$C_8$ alcohol, $C_1$–$C_8$ ketone, $C_1$–$C_8$ ester and mixtures thereof.

14. The process as claimed in claim 1, wherein the drying is carried out a temperature from 25° C. to 100° C.

15. The process as claimed in claim 1, wherein the drying is conducted by vacuum drying.

16. The process as claimed in claim 1, wherein the drying is conducted by air drying.

17. The process as claimed in claim 1, wherein said casting polymer solution is casted on a material selected from a group consisting of a glass plate, a polytetrafluoroethylene plate, a metal plate, PVDF film, polysulfone film, PVDF fabric, polysulfone fabric, PVDF nonwoven fabric, and polysulfone nonwoven fabric.

18. The method as claimed in 1, further comprising subjecting the dried membrane to a heat treatment at 25°–150° C. for 1–12 hours.

19. The process of claim 1 wherein in step (c) the casted polymer together with the support is immediately immersed in a nonsolvent coagulant.

* * * * *